(12) United States Patent
Pos

(10) Patent No.: US 7,533,933 B2
(45) Date of Patent: May 19, 2009

(54) CHILD SEAT FOR A MOTOR VEHICLE

(75) Inventor: Martin Pos, Bayreuth (DE)

(73) Assignee: Cybex Industrial, Ltd., Hong Kong (CN)

( * ) Notice: Subject to any disclaimer, the term of this patent is extended or adjusted under 35 U.S.C. 154(b) by 0 days.

(21) Appl. No.: 11/832,524

(22) Filed: Aug. 1, 2007

(65) Prior Publication Data

US 2008/0018158 A1    Jan. 24, 2008

Related U.S. Application Data

(63) Continuation of application No. 11/143,318, filed on Jun. 2, 2005, now Pat. No. 7,275,792.

(30) Foreign Application Priority Data

Aug. 12, 2004  (DE) ................ 10 2004 039 204
Sep. 23, 2004  (DE) ................ 10 2004 046 163

(51) Int. Cl.
  A47C 1/08    (2006.01)
  A47C 7/36    (2006.01)
(52) U.S. Cl. .................... 297/250.1; 297/408
(58) Field of Classification Search ............ 297/250.1, 297/256.1, 256.13, 408, 230.14, 357
See application file for complete search history.

(56) References Cited

U.S. PATENT DOCUMENTS

| | | | | |
|---|---|---|---|---|
| 1,256,856 A | * | 2/1918 | Wittwer | 297/357 |
| 1,922,418 A | * | 8/1933 | Conant | 297/357 |
| 2,310,346 A | * | 2/1943 | Bell | 248/408 |
| 2,411,063 A | * | 11/1946 | Scott | 297/357 |
| 2,869,622 A | * | 1/1959 | Petersen et al. | 297/396 |
| 3,594,040 A | * | 7/1971 | Monroe | 297/257 |
| 3,784,253 A | | 1/1974 | Kohler et al. | |
| 4,041,939 A | | 8/1977 | Hall | 128/69 |
| 4,065,817 A | | 1/1978 | Branemark et al. | 3/1.91 |
| 4,347,845 A | | 9/1982 | Mayfield | 128/303 |
| 4,369,770 A | | 1/1983 | Bacal et al. | 128/69 |

(Continued)

FOREIGN PATENT DOCUMENTS

DE    73 38 951 U1    1/1974

(Continued)

OTHER PUBLICATIONS

Mekanika—The Spinal Stabilization Company, product description for Modulus System, 2 pages, http://mekanika.com/htm/modsystem.htm.

(Continued)

*Primary Examiner*—Sarah B McPartlin
(74) *Attorney, Agent, or Firm*—Drinker Biddle & Reath LLP

(57) ABSTRACT

Child seat for motor vehicles with a seat shell and backrest, at the upper end of which a head support (10) with lateral wings (11) projecting towards the front is disposed. The inclination of the head support (10), at least of a headrest (12) disposed between the two lateral wings (11) of the same, can be adjusted relative to the backrest (arrows 13, 14), in particular, between an upright, waking position "W" extending approximately parallel to the backrest and a resting or sleeping position "S" inclined towards the rear.

20 Claims, 4 Drawing Sheets

U.S. PATENT DOCUMENTS

| | | | |
|---|---|---|---|
| 4,382,438 A | 5/1983 | Jacobs | 128/69 |
| 4,409,968 A | 10/1983 | Drummond | 128/69 |
| 4,411,259 A | 10/1983 | Drummond | 128/69 |
| 4,422,451 A | 12/1983 | Kalamchi | 128/69 |
| 4,479,491 A | 10/1984 | Martin | 128/92 |
| 4,567,885 A | 2/1986 | Androphy | 128/92 |
| 4,573,454 A | 3/1986 | Hoffman | 128/92 |
| 4,604,995 A | 8/1986 | Stephens et al. | 128/69 |
| 4,611,580 A | 9/1986 | Wu | 128/69 |
| 4,611,581 A | 9/1986 | Steffee | 128/69 |
| 4,611,582 A | 9/1986 | Duff | 128/69 |
| 4,641,636 A | 2/1987 | Cotrel | 128/69 |
| 4,648,388 A | 3/1987 | Steffee | 128/69 |
| 4,653,481 A | 3/1987 | Howland et al. | 128/69 |
| 4,653,489 A | 3/1987 | Tronzo | 128/92 |
| 4,655,199 A | 4/1987 | Steffee | 128/69 |
| 4,658,809 A | 4/1987 | Ulrich et al. | 128/92 |
| 4,696,290 A | 9/1987 | Steffee | 128/69 |
| 4,719,905 A | 1/1988 | Steffee | 128/69 |
| 4,763,644 A | 8/1988 | Webb | 128/69 |
| 4,773,402 A | 9/1988 | Asher et al. | 128/69 |
| 4,805,602 A | 2/1989 | Puno et al. | 128/69 |
| 4,815,453 A | 3/1989 | Cotrel | 128/69 |
| 4,887,595 A | 12/1989 | Heinig et al. | 606/61 |
| 4,913,134 A | 4/1990 | Luque | 128/69 |
| 4,946,458 A | 8/1990 | Harms et al. | 606/61 |
| 4,950,269 A | 8/1990 | Gaines, Jr. | 606/61 |
| 4,955,885 A | 9/1990 | Meyers | 606/53 |
| 4,987,892 A | 1/1991 | Krag et al. | 606/61 |
| 5,005,562 A | 4/1991 | Cotrel | 128/69 |
| 5,024,213 A | 6/1991 | Asher et al. | 128/69 |
| 5,030,220 A | 7/1991 | Howland | 606/61 |
| 5,042,982 A | 8/1991 | Harms et al. | 606/61 |
| 5,047,029 A | 9/1991 | Aebi et al. | 606/61 |
| 5,067,955 A | 11/1991 | Cotrel | 606/61 |
| 5,074,864 A | 12/1991 | Cozad et al. | 606/54 |
| 5,084,049 A | 1/1992 | Asher et al. | 606/61 |
| 5,092,866 A | 3/1992 | Breard et al. | 606/61 |
| 5,102,412 A | 4/1992 | Rogozinski | 606/61 |
| 5,112,332 A | 5/1992 | Cozad et al. | 606/61 |
| 5,113,685 A | 5/1992 | Asher et al. | 72/458 |
| 5,127,912 A | 7/1992 | Ray et al. | 606/61 |
| 5,129,388 A | 7/1992 | Vignaud et al. | 606/61 |
| 5,129,900 A | 7/1992 | Asher et al. | 606/61 |
| 5,147,359 A | 9/1992 | Cozad et al. | 606/61 |
| 5,154,718 A | 10/1992 | Cozad et al. | 606/61 |
| 5,176,680 A | 1/1993 | Vignaud et al. | 606/61 |
| 5,180,393 A | 1/1993 | Commarmond | 623/13 |
| 5,190,543 A | 3/1993 | Schläpfer | 606/61 |
| 5,201,734 A | 4/1993 | Cozad et al. | 606/62 |
| 5,207,678 A | 5/1993 | Harms et al. | 606/61 |
| 5,261,911 A | 11/1993 | Carl | 606/61 |
| 5,382,248 A | 1/1995 | Jacobson et al. | 606/60 |
| 5,385,583 A | 1/1995 | Cotrel | 623/17 |
| 5,387,213 A | 2/1995 | Breard et al. | 606/61 |
| 5,415,661 A | 5/1995 | Holmes | 606/69 |
| 5,429,639 A | 7/1995 | Judet | 606/61 |
| 5,443,467 A | 8/1995 | Biedermann et al. | 606/65 |
| 5,466,237 A | 11/1995 | Byrd, III et al. | 606/61 |
| 5,474,555 A | 12/1995 | Puno et al. | 606/73 |
| 5,487,742 A | 1/1996 | Cotrel | 606/61 |
| 5,496,321 A | 3/1996 | Puno et al. | 606/61 |
| 5,498,264 A | 3/1996 | Schlapfer et al. | 606/72 |
| 5,520,689 A | 5/1996 | Schläpfer et al. | 606/61 |
| 5,534,001 A | 7/1996 | Schlapfer et al. | 606/61 |
| 5,536,268 A | 7/1996 | Griss | 606/61 |
| 5,653,708 A | 8/1997 | Howland | 606/61 |
| 5,658,284 A | 8/1997 | Sebastian et al. | 606/61 |
| 5,667,506 A | 9/1997 | Sutterlin | 606/61 |
| 5,667,507 A | 9/1997 | Corin et al. | 606/61 |
| 5,669,910 A | 9/1997 | Korhonen et al. | 606/61 |
| 5,672,175 A | 9/1997 | Martin | 606/61 |
| 5,672,176 A | 9/1997 | Biedermann et al. | 606/61 |
| 5,676,665 A | 10/1997 | Bryan | 606/61 |
| 5,676,703 A | 10/1997 | Gelbard | 623/17 |
| 5,681,311 A | 10/1997 | Foley et al. | 606/61 |
| 5,681,319 A | 10/1997 | Biedermann et al. | 606/104 |
| 5,683,391 A | 11/1997 | Boyd | 606/61 |
| 5,683,392 A | 11/1997 | Richelsoph et al. | 606/61 |
| 5,683,393 A | 11/1997 | Ralph | 606/61 |
| 5,713,900 A | 2/1998 | Benzel et al. | 606/61 |
| 5,713,904 A | 2/1998 | Errico et al. | 606/73 |
| 5,716,355 A | 2/1998 | Jackson et al. | 606/61 |
| 5,716,356 A | 2/1998 | Biedermann et al. | 606/61 |
| 5,716,357 A | 2/1998 | Rogozinski | 606/61 |
| 5,716,358 A | 2/1998 | Ochoa et al. | 606/62 |
| 5,716,359 A | 2/1998 | Ojima et al. | 606/76 |
| 5,720,751 A | 2/1998 | Jackson | 606/86 |
| 5,725,528 A | 3/1998 | Errico et al. | 606/61 |
| 5,725,582 A | 3/1998 | Bevan et al. | 623/17 |
| 5,728,098 A | 3/1998 | Sherman et al. | 606/61 |
| 5,733,286 A | 3/1998 | Errico et al. | 606/61 |
| 5,735,851 A | 4/1998 | Errico et al. | 606/61 |
| 5,741,254 A | 4/1998 | Henry et al. | 606/61 |
| 5,810,445 A | 9/1998 | Surot | |
| 5,891,145 A | 4/1999 | Morrison et al. | 606/61 |
| 5,899,904 A | 5/1999 | Errico et al. | 606/61 |
| RE36,221 E | 6/1999 | Breard et al. | 606/61 |
| 5,910,142 A | 6/1999 | Tatar | 606/61 |
| 5,925,047 A | 7/1999 | Errico et al. | 606/65 |
| 5,928,231 A | 7/1999 | Klein et al. | 606/60 |
| 5,928,232 A | 7/1999 | Howland et al. | 606/61 |
| 5,928,233 A | 7/1999 | Apfelbaum et al. | 606/61 |
| 5,947,965 A | 9/1999 | Bryan | 606/61 |
| 5,947,969 A | 9/1999 | Errico et al. | 606/61 |
| 5,954,725 A | 9/1999 | Sherman et al. | 606/78 |
| 5,961,517 A | 10/1999 | Biedermann et al. | 606/61 |
| 5,964,760 A | 10/1999 | Richelsoph | 606/61 |
| 5,980,521 A | 11/1999 | Montague et al. | 606/61 |
| 6,090,111 A | 7/2000 | Nichols | 606/61 |
| 6,096,039 A | 8/2000 | Stoltenberg et al. | 606/61 |
| 6,113,600 A | 9/2000 | Drummond et al. | 606/61 |
| 6,113,601 A | 9/2000 | Tatar | 606/61 |
| 6,127,597 A | 10/2000 | Beyar et al. | 623/16 |
| 6,132,430 A | 10/2000 | Wagner | 606/61 |
| 6,132,434 A | 10/2000 | Sherman et al. | 606/78 |
| 6,136,000 A | 10/2000 | Louis et al. | 606/61 |
| 6,146,383 A | 11/2000 | Studer et al. | 606/61 |
| 6,171,311 B1 | 1/2001 | Richelsoph | 606/61 |
| 6,193,720 B1 | 2/2001 | Yuan et al. | 606/61 |
| 6,197,028 B1 | 3/2001 | Ray et al. | 606/61 |
| 6,199,947 B1 | 3/2001 | Wiklund | |
| 6,210,413 B1 | 4/2001 | Justis et al. | 606/61 |
| 6,217,578 B1 | 4/2001 | Crozet et al. | 606/61 |
| 6,250,716 B1 | 6/2001 | Clough | |
| 6,273,509 B1 | 8/2001 | Reithmeier et al. | |
| 6,378,950 B1 | 4/2002 | Takamizu et al. | |
| 6,379,354 B1 | 4/2002 | Rogozinski | 606/61 |
| 6,402,749 B1 | 6/2002 | Ashman | 606/61 |
| 6,402,751 B1 | 6/2002 | Hoeck et al. | 606/61 |
| 6,402,752 B2 | 6/2002 | Schäffler-Wachter et al. | 606/61 |
| 6,413,257 B1 | 7/2002 | Lin et al. | 606/61 |
| 6,416,515 B1 | 7/2002 | Wagner | 606/61 |
| 6,423,064 B1 | 7/2002 | Kluger | 606/61 |
| 6,440,169 B1 | 8/2002 | Elberg et al. | 623/17.16 |
| 6,451,021 B1 | 9/2002 | Ralph et al. | 606/61 |
| 6,454,773 B1 | 9/2002 | Sherman et al. | 606/78 |
| 6,458,131 B1 | 10/2002 | Ray | 606/61 |
| 6,458,132 B2 | 10/2002 | Choi | 606/61 |
| 6,467,846 B2 | 10/2002 | Clough | |
| 6,468,276 B1 | 10/2002 | McKay | 606/61 |
| 6,471,705 B1 | 10/2002 | Biedermann et al. | 606/61 |
| 6,565,567 B1 | 5/2003 | Haider | 606/61 |
| 6,565,605 B2 | 5/2003 | Goble et al. | 623/17.11 |

| | | |
|---|---|---|
| 6,572,617 B1 | 6/2003 | Senegas ... 606/61 |
| 6,572,653 B1 | 6/2003 | Simonson ... 623/17.13 |
| 6,579,290 B1 | 6/2003 | Hardcastle et al. ... 606/61 |
| 6,585,737 B1 | 7/2003 | Baccelli et al. ... 606/61 |
| 6,616,669 B2 | 9/2003 | Ogilvie et al. ... 606/61 |
| 6,623,485 B2 | 9/2003 | Doubler et al. ... 606/61 |
| 6,626,905 B1 | 9/2003 | Schmiel et al. ... 606/61 |
| 6,626,908 B2 | 9/2003 | Cooper et al. ... 606/61 |
| 6,645,207 B2 | 11/2003 | Dixon et al. ... 606/61 |
| 6,652,526 B1 | 11/2003 | Arafiles ... 606/61 |
| 6,656,181 B2 | 12/2003 | Dixon et al. ... 606/69 |
| 6,660,004 B2 | 12/2003 | Barker et al. ... 606/61 |
| 6,783,527 B2 | 8/2004 | Drewry et al. ... 606/61 |
| 6,786,907 B2 | 9/2004 | Lange ... 606/61 |
| 6,793,656 B1 | 9/2004 | Mathews ... 606/61 |
| 6,805,695 B2 | 10/2004 | Keith et al. ... 606/61 |
| 6,805,714 B2 | 10/2004 | Sutcliffe ... 623/17.11 |
| 6,811,567 B2 | 11/2004 | Reiley ... 623/17.11 |
| 6,832,999 B2 | 12/2004 | Ueyama et al. ... 606/61 |
| 6,840,940 B2 | 1/2005 | Ralph et al. ... 606/61 |
| 6,843,791 B2 | 1/2005 | Serhan ... 606/61 |
| 6,852,128 B2 | 2/2005 | Lange ... 623/17.11 |
| 6,858,030 B2 | 2/2005 | Martin et al. ... 606/61 |
| 6,869,433 B2 | 3/2005 | Glascott ... 606/73 |
| 6,875,211 B2 | 4/2005 | Nichols et al. ... 606/61 |
| 6,881,215 B2 | 4/2005 | Assaker et al. ... 606/61 |
| 7,018,379 B2 | 3/2006 | Drewry ... 606/61 |
| 7,022,122 B2 | 4/2006 | Amrein et al. ... 606/61 |
| 7,029,475 B2 | 4/2006 | Panjabi ... 606/61 |
| 7,040,705 B2 * | 5/2006 | Clough ... 297/410 |
| 7,048,736 B2 | 5/2006 | Robinson et al. ... 606/61 |
| 7,051,451 B2 | 5/2006 | Augostino et al. ... 33/512 |
| 7,060,066 B2 | 6/2006 | Zhao et al. ... 606/61 |
| 7,074,237 B2 | 7/2006 | Goble et al. ... 623/17.11 |
| 7,081,117 B2 | 7/2006 | Bono et al. ... 606/61 |
| 7,083,621 B2 | 8/2006 | Shaolian et al. ... 606/61 |
| 7,083,622 B2 | 8/2006 | Simonson ... 606/61 |
| 7,087,056 B2 | 8/2006 | Vaughan ... 606/61 |
| 7,087,057 B2 | 8/2006 | Konieczynski et al. ... 606/73 |
| 7,087,084 B2 | 8/2006 | Reiley ... 623/17.11 |
| 7,090,698 B2 | 8/2006 | Goble et al. ... 623/17.11 |
| 7,275,792 B2 * | 10/2007 | Pos ... 297/396 |
| 2002/0013586 A1 | 1/2002 | Justis et al. |
| 2002/0026192 A1 | 2/2002 | Schmiel et al. |
| 2002/0068975 A1 | 6/2002 | Teitelbaum et al. |
| 2002/0082603 A1 | 6/2002 | Dixon et al. |
| 2002/0120271 A1 | 8/2002 | Dixon et al. |
| 2002/0143329 A1 | 10/2002 | Serhan et al. |
| 2002/0169450 A1 | 11/2002 | Lange |
| 2003/0004511 A1 | 1/2003 | Ferree |
| 2003/0057753 A1 * | 3/2003 | Takizawa ... 297/250.1 |
| 2003/0073996 A1 | 4/2003 | Doubler et al. |
| 2003/0073997 A1 | 4/2003 | Doubler et al. |
| 2003/0083657 A1 | 5/2003 | Drewry et al. |
| 2003/0125742 A1 | 7/2003 | Yuan et al. |
| 2003/0171749 A1 | 9/2003 | Le Couedic et al. |
| 2003/0173804 A1 | 9/2003 | Fisher et al. |
| 2004/0015166 A1 | 1/2004 | Gorek |
| 2004/0172022 A1 | 9/2004 | Landry et al. |
| 2004/0172024 A1 | 9/2004 | Gorek |
| 2004/0215192 A1 | 10/2004 | Justis et al. |
| 2004/0225289 A1 | 11/2004 | Biedermann et al. |
| 2004/0230192 A1 | 11/2004 | Graf |
| 2004/0236327 A1 | 11/2004 | Paul et al. |
| 2004/0236330 A1 | 11/2004 | Purcell et al. |
| 2005/0033441 A1 | 2/2005 | Lambrecht et al. |
| 2005/0049589 A1 | 3/2005 | Jackson |
| 2005/0065515 A1 | 3/2005 | Jahng |
| 2005/0070899 A1 | 3/2005 | Doubler et al. |
| 2005/0070901 A1 | 3/2005 | David |
| 2005/0080415 A1 | 4/2005 | Keyer et al. |
| 2005/0085813 A1 | 4/2005 | Spitler et al. |
| 2005/0171543 A1 | 8/2005 | Timm et al. |
| 2005/0177156 A1 | 8/2005 | Timm et al. |
| 2005/0177157 A1 | 8/2005 | Jahng |
| 2005/0177164 A1 | 8/2005 | Walters et al. |
| 2005/0177166 A1 | 8/2005 | Timm et al. |
| 2005/0182400 A1 | 8/2005 | White |
| 2005/0182401 A1 | 8/2005 | Timm et al. |
| 2005/0182409 A1 | 8/2005 | Callahan et al. |
| 2005/0187548 A1 | 8/2005 | Butler et al. |
| 2005/0192569 A1 | 9/2005 | Nichols et al. |
| 2005/0192571 A1 | 9/2005 | Abdelgany |
| 2005/0192572 A1 | 9/2005 | Abdelgany et al. |
| 2005/0203514 A1 | 9/2005 | Jahng et al. |
| 2005/0203517 A1 | 9/2005 | Jahng et al. |
| 2005/0277922 A1 | 12/2005 | Trieu et al. |
| 2005/0277925 A1 | 12/2005 | Mujwid |
| 2005/0277927 A1 | 12/2005 | Guenther et al. |
| 2005/0277928 A1 | 12/2005 | Boschert |
| 2005/0288670 A1 | 12/2005 | Panjabi et al. |
| 2005/0288671 A1 | 12/2005 | Yuan et al. |
| 2006/0004357 A1 | 1/2006 | Lee et al. |
| 2006/0025771 A1 | 2/2006 | Jackson |
| 2006/0030839 A1 | 2/2006 | Park et al. |
| 2006/0036242 A1 | 2/2006 | Nilsson et al. |
| 2006/0036324 A1 | 2/2006 | Sachs et al. |
| 2006/0052783 A1 | 3/2006 | Dant et al. |
| 2006/0052784 A1 | 3/2006 | Dant et al. |
| 2006/0052786 A1 | 3/2006 | Dant et al. |
| 2006/0084985 A1 | 4/2006 | Kim |
| 2006/0084987 A1 | 4/2006 | Kim |
| 2006/0084988 A1 | 4/2006 | Kim |
| 2006/0084989 A1 | 4/2006 | Dickinson et al. |
| 2006/0084990 A1 | 4/2006 | Gournay et al. |
| 2006/0084993 A1 | 4/2006 | Landry et al. |
| 2006/0084995 A1 | 4/2006 | Biedermann et al. |
| 2006/0085069 A1 | 4/2006 | Kim |
| 2006/0085070 A1 | 4/2006 | Kim |
| 2006/0089643 A1 | 4/2006 | Mujwid |
| 2006/0089644 A1 | 4/2006 | Felix |
| 2006/0095035 A1 | 5/2006 | Jones et al. |
| 2006/0095038 A1 | 5/2006 | Jackson |
| 2006/0100621 A1 | 5/2006 | Jackson |
| 2006/0149232 A1 | 7/2006 | Sasing |
| 2006/0149234 A1 | 7/2006 | de Coninck |
| 2006/0149237 A1 | 7/2006 | Markworth et al. |
| 2006/0149238 A1 | 7/2006 | Sherman et al. |
| 2006/0149240 A1 | 7/2006 | Jackson |
| 2006/0149242 A1 | 7/2006 | Kraus et al. |
| 2006/0149244 A1 | 7/2006 | Amrein et al. |
| 2006/0149380 A1 | 7/2006 | Lotz et al. |
| 2006/0155277 A1 | 7/2006 | Metz-Stavenhagen |
| 2006/0155278 A1 | 7/2006 | Warnick |
| 2006/0161153 A1 | 7/2006 | Hawkes et al. |
| 2006/0173456 A1 | 8/2006 | Hawkes et al. |
| 2006/0195093 A1 | 8/2006 | Jahng |
| 2006/0200128 A1 | 9/2006 | Mueller |
| 2006/0241595 A1 | 10/2006 | Molz, IV et al. |
| 2006/0241599 A1 | 10/2006 | Konieczynski et al. |
| 2006/0241600 A1 | 10/2006 | Ensign et al. |
| 2006/0241601 A1 | 10/2006 | Trautwein et al. |
| 2006/0241603 A1 | 10/2006 | Jackson |
| 2006/0241757 A1 | 10/2006 | Anderson |
| 2006/0247623 A1 | 11/2006 | Anderson et al. |
| 2006/0247624 A1 | 11/2006 | Bonouskou et al. |
| 2006/0247628 A1 | 11/2006 | Rawlins et al. |
| 2006/0247631 A1 | 11/2006 | Ahn et al. |
| 2006/0247636 A1 | 11/2006 | Yuan et al. |
| 2006/0247637 A1 | 11/2006 | Colleran et al. |
| 2006/0253118 A1 | 11/2006 | Bailey |
| 2006/0264935 A1 | 11/2006 | White |
| 2007/0088359 A1 | 4/2007 | Woods et al. |
| 2007/0093814 A1 | 4/2007 | Callahan, II et al. |
| 2007/0093820 A1 | 4/2007 | Freudiger |
| 2007/0093821 A1 | 4/2007 | Freudiger |

| | | | |
|---|---|---|---|
| 2007/0093829 | A1 | 4/2007 | Abdou |
| 2007/0118122 | A1 | 5/2007 | Butler et al. |
| 2007/0123861 | A1 | 5/2007 | Dewey et al. |
| 2007/0123871 | A1 | 5/2007 | Jahng |
| 2007/0156143 | A1 | 7/2007 | Lancial |
| 2007/0161994 | A1 | 7/2007 | Lowery et al. |
| 2007/0161997 | A1 | 7/2007 | Thramann et al. |
| 2007/0162007 | A1 | 7/2007 | Shoham |
| 2007/0167947 | A1 | 7/2007 | Gittings |
| 2007/0168035 | A1 | 7/2007 | Koske |

FOREIGN PATENT DOCUMENTS

| | | | |
|---|---|---|---|
| DE | 35 36 206 | A1 | 4/1987 |
| DE | 39 31 436 | A1 | 4/1991 |
| DE | 40 34 120 | A1 | 10/1991 |
| DE | 689 03 571 | T2 | 4/1993 |
| DE | 43 28 635 | C1 | 9/1994 |
| DE | 43 33 855 | C2 | 4/1995 |
| DE | 195 48 339 | A1 | 6/1997 |
| DE | 196 11 588 | C2 | 9/1997 |
| DE | 698 08 973 | T2 | 8/2003 |
| EP | 1 084 900 | A2 | 3/2001 |
| FR | 2612070 | A1 | 9/1988 |
| FR | 2615095 | A1 | 11/1988 |
| FR | 2 816 558 | A3 | 11/2001 |
| FR | 2880256 | B1 | 7/2006 |
| GB | 780652 | | 8/1957 |
| GB | 1 200 626 | A | 7/1970 |
| GB | 2173104 | | 10/1986 |
| GB | 2382304 | | 5/2003 |
| JP | S53-145625 | U | 11/1978 |
| WO | WO 87/07134 | | 12/1987 |
| WO | WO 94/21185 | | 9/1994 |
| WO | WO 98/27884 | | 7/1998 |
| WO | WO 00/40433 | A1 | 7/2000 |
| WO | WO 01/45576 | | 6/2001 |
| WO | WO 01/91656 | | 12/2001 |
| WO | WO 02/07621 | | 1/2002 |
| WO | WO 02/07622 | | 1/2002 |
| WO | WO 02/17803 | | 3/2002 |
| WO | WO 02/39921 | | 5/2002 |
| WO | WO 02/43603 | | 6/2002 |
| WO | WO 02/102259 | | 12/2002 |
| WO | WO 03/007828 | | 1/2003 |
| WO | WO 03/009737 | | 2/2003 |
| WO | WO 03/015647 | | 2/2003 |
| WO | WO 03/037216 | | 5/2003 |
| WO | WO 03/077806 | | 9/2003 |
| WO | WO 2004/000602 | A1 | 12/2003 |
| WO | WO2004/024011 | | 3/2004 |
| WO | WO2004/034916 | | 4/2004 |
| WO | WO2006/033503 | | 3/2006 |
| WO | WO2006/066685 | | 6/2006 |
| WO | WO2006/105935 | | 10/2006 |
| WO | WO2007/080317 | | 7/2007 |
| WO | WO2008/034130 | | 3/2008 |

OTHER PUBLICATIONS

Zimmer Spine, product description for Dynesis—The Dynamic Stabilization System, 5 pages, http://www.zimmer.com/ctl?template=IN&action=1&op=global&id=9165&pr=Y.

Itoika Medical Instruments, product description for S-Plate, 15 pages, http://ito-ika.co.jp/s-plate/splate1.pdf and http://ito-ika.co.jp/s-plate/splate1.pdf.

"Flexible rods and the case for dynamic stabilization," Jason M. Highsmith, M.D., et al., *Neurosurg. Focus*, vol. 22, Jan. 2007, pp. 1-5.

"The Spinous Process: The Forgotten Appendage," Kenneth R. Kattan, M. D. eta l., *Skeletal Radiology*, vol. 6, 1981, pp. 199-204.

"Morphological and functional changes of the lumbar spinous processes in the elderly," R. Scapinelli, *Surgical Radiologic Anatomy*, vol. 11, 1989, pp. 129-133.

"The Paraspinal Sacrospinalis-Splitting Approach to the Lumbar Spine," Leon L. Wiltse et al., *The Journal of Bone & Joint Surgery*, vol. 50-A, No. 5, Jul. 1968 pp. 919-926.

*Dynamic Reconstruction of the Spine*, D.H. Kim et al., 2006, cover through page xix.

"Historical Review of Spinal Arthroplasty and Dynamic Stabilizations," K M. Shibata et al., *Dynamic Reconstruction of the Spine*, Section I, Motion Preservation of the Spine, Chapter 1, 2006, pp. 3-15.

"Current Concepts in Spinal Fusion versus Nonfusion," D.H. Walker et al., *Dynamic Reconstruction of the Spine*, Section I, Motion Preservation of the Spine, Chapter 2, 2006, pp. 16-23.

"Biomechanical Aspects Associated with Cervical Disk Arthroplasty," D.J. DiAngelo et al., *Dynamic Reconstruction of the Spine*, Section II, Restoration of Cervical Motion Segment, Chapter 3, 2006, pp. 27-32.

"Biomechanical Testing Protocol for Evaluating Cervical Disk Arthroplasty," D.J. DiAngelo et al., *Dynamic Reconstruction of the Spine*, Section II, Restoration of Cervical Motion Segment, Chapter 4, 2006, pp. 33-41.

"Cervical Disk Arthroplasty: Rationale, Indications, and Clinical Experience," M.R. Lim et al., *Dynamic Reconstruction of the Spine*, Section II, Restoration of Cervical Motion Segment, Chapter 5, 2006, pp. 42-51.

"Spinal Kinetics Cervical Disc," D.H. Kim et al., *Dynamic Reconstruction of the Spine*, Section II, Restoration of Cervical Motion Segment, Chapter 6, 2006, pp. 52-58.

"Bryan Cervical Disc Device," R. Hacker, *Dynamic Reconstruction of the Spine*, Section II, Restoration of Cervical Motion Segment, Chapter 7, 2006, pp. 59-66.

"Prestige Cervical Artificial Disk," J.T. Robertson, *Dynamic Reconstruction of the Spine*, Section II, Restoration of Cervical Motion Segment, Chapter 8, 2006, pp. 67-71.

"ProDisc-C Cervical Artificial Disk" G.K. Jeong et al., *Dynamic Reconstruction of the Spine*, Section II, Restoration of Cervical Motion Segment, Chapter 9, 2006, pp. 72-77.

"PCM (Porous Coated Motion) Artificial Cervical Disc," L Pimenta et al., *Dynamic Reconstruction of the Spine*, Section II, Restoration of Cervical Motion Segment, Chapter 10, 2006, pp. 78-85.

"Cervidisc Concept: Six-Year Follow-Up and Introducing Cervidisc II: DISCOCERV," A.S. Ramadan et al., *Dynamic Reconstruction of the Spine*, Section II, Restoration of Cervical Motion Segment, Chapter 11, 2006, pp. 86-91.

"CerviCore Cervical Intervertebral Disk Replacement," S.S. Lee et al., *Dynamic Reconstruction of the Spine*, Section II, Restoration of Cervical Motion Segment, Chapter 12, 2006, pp. 92-95.

"Prosthetic Disk Nucleus Partial Disk Replacement: Pathobiological and Biomechanical Rationale for Design and Function," C.D. Ray et al., *Dynamic Reconstruction of the Spine*, Section III, Restoration of Lumbar Motion Segment, A. Lumbar Nucleus Replacement, Chapter 13, 2006, pp. 99-104.

"The Raymedica Prosthetic Disk Nucleus (PDN): Stabilizing the Degenerated Lumbar Vertebral Segment without Fusion or Total Disk Replacement," C.D. Ray, *Dynamic Reconstruction of the Spine*, Section III, Restoration of Lumbar Motion Segment, A. Lumbar Nucleus Replacement, Chapter 14, pp. 105-113.

"Functional Lumbar Artificial Nucleus Replacement: The DASCOR System," J.E. Sherman et al., *Dynamic Reconstruction of the Spine*, Section III, Restoration of Lumbar Motion Segment, A. Lumbar Nucleus Replacement, Chapter 15, 2006, pp. 114-121.

"NeuDisc," R. Bertagnoli et al., *Dynamic Reconstruction of the Spine*, Section III, Restoration of Lumbar Motion Segment, A. Lumbar Nucleus Replacement, Chapter 16, 2006, pp. 122-126.

"Pioneer Surgical Technology NUBAC Artificial Nucleus," Q. Bao et al., *Dynamic Reconstruction of the Spine*, Section III, Restoration of Lumbar Motion Segment, A. Lumbar Nucleus Replacement, Chapter 17, 2006, pp. 128-136.

"SINUX (Sinitec)," J. Zoellner, *Dynamic Reconstruction of the Spine*, Section III, Restoration of Lumbar Motion Segment, A. Lumbar Nucleus Replacement, Chapter 18, 2006, pp. 137-141.

"Nucore Injectable Disk Nucleus," S.H. Kitchel et al., *Dynamic Reconstruction of the Spine*, Section III, Restoration of Lumbar Motion Segment, A. Lumbar Nucleus Replacement, Chapter 19, 2006, pp. 142-146.

"Biomechanical Considerations for Total Lumbar Disk Replacement," J. LeHuec et al., *Dynamic Reconstruction of the Spine*, Section III, Restoration of Lumbar Motion Segment, B. Lumbar Total Disk Replacement, Chapter 20, 2006, pp. 149-153.

"Indications for Total Lumbar Disk Replacement," R. Bertagnoli, *Dynamic Reconstruction of the Spine*, Section III, Restoration of Lumbar Motion Segment, B. Lumbar Total Disk Replacement, Chapter 21, 2006, pp. 154-159.

"CHARTÉ Artificial Disc," F.H. Geisler, *Dynamic Reconstruction of the Spine*, Section III, Restoration of Lumbar Motion Segment, B. Lumbar Total Disk Replacement, Chapter 22, 2006, pp. 160-178.

"ProDisc Lumbar Artificial Disk," J.E.Zigler et al., *Dynamic Reconstruction of the Spine*, Section III, Restoration of Lumbar Motion Segment, B. Lumbar Total Disk Replacement, Chapter 23, 2006, pp. 179-185.

"MAVERICK Total Disc Replacement," M.F. Gornet, *Dynamic Reconstruction of the Spine*, Section III, Restoration of Lumbar Motion Segment, B. Lumbar Total Disk Replacement, Chapter 24, 2006, pp. 186-195.

"The Mobidisc Prosthesis," J.P. Steib et al., *Dynamic Reconstruction of the Spine*, Section III, Restoration of Lumbar Motion Segment, B. Lumbar Total Disk Replacement, Chapter 25, 2006, pp. 196-203.

"Activ-L Lumbar (Aesculap) Total Disk Arthroplasty," J.J. Yue et al., *Dynamic Reconstruction of the Spine*, Section III, Restoration of Lumbar Motion Segment, B. Lumbar Total Disk Replacement, Chapter 26, 2006, pp. 204-211.

"The FlexiCore Disk," A.D. Sharan et al., *Dynamic Reconstruction of the Spine*, Section III, Restoration of Lumbar Motion Segment, B. Lumbar Total Disk Replacement, Chapter 27, 2006, pp. 212-220.

"Management of Vascular and Surgical Approach—Related Complications for Lumbar Total Disk Replacement," S.H. Lee et al., *Dynamic Reconstruction of the Spine*, Section III, Restoration of Lumbar Motion Segment, B. Lumbar Total Disk Replacement, Chapter 28, 2006, pp. 221-226.

"Complications of Lumbar Disk Arthroplasty," SH Lee et al., *Dynamic Reconstruction of the Spine*, Section III, Restoration of Lumbar Motion Segment, B. Lumbar Total Disk Replacement, Chapter 29, 2006, pp. 227-233.

"Rationale for Dynamic Stabilization," D.S. McNally, *Dynamic Reconstruction of the Spine*, Section III, Restoration of Lumbar Motion Segment, C. Dynamic Posterior Stabilization, Chapter 30, 2006, pp. 237-243.

"Rationale for Dynamic Stabilization II—SoftFlex System," D.K. Sengupta, *Dynamic Reconstruction of the Spine*, Section III, Restoration of Lumbar Motion Segment, C. Dynamic Posterior Stabilization, Chapter 31, 2006, pp. 244-250.

"The X STOP Interspinous Process Decompression System for the Treatment of Lumbar Neurogenic Claudication," R.M. Thunder et al., *Dynamic Reconstruction of the Spine*, Section III, Restoration of Lumbar Motion Segment, C. Dynamic Posterior Stabilization, Chapter 32, 2006, pp. 251-257.

"Dynamic Lumbar Stabilization with the Wallis Interspinous Implant," J. Sénégas, *Dynamic Reconstruction of the Spine*, Section III, Restoration of Lumbar Motion Segment, C. Dynamic Posterior Stabilization, Chapter 33, 2006, pp. 258-267.

"Coflex," ES Kim et al., *Dynamic Reconstruction of the Spine*, Section III, Restoration of Lumbar Motion Segment, C. Dynamic Posterior Stabilization, Chapter 34, 2006, pp. 268-273.

DIAM (Device for Intervertebral Assisted Motion) Spinal Stabilization System, K. Singh et al., *Dynamic Reconstruction of the Spine*, Section III, Restoration of Lumbar Motion Segment, C. Dynamic Posterior Stabilization, Chapter 35, 2006, pp. 274-283.

"Tension Band System," SH Lee et al., *Dynamic Reconstruction of the Spine*, Section III, Restoration of Lumbar Motion Segment, C. Dynamic Posterior Stabilization, Chapter 36, 2006, pp. 284-291.

"Shape Memory Implant (KIMPF-DI Fixing) System," YS Kim et al., *Dynamic Reconstruction of the Spine*, Section III, Restoration of Lumbar Motion Segment, C. Dynamic Posterior Stabilization, Chapter 37, 2006, pp. 292-298.

"Treatment of Mobile Vertebral Instability with Dynesys," G. Dubois et al., *Dynamic Reconstruction of the Spine*, Section III, Restoration of Lumbar Motion Segment, C. Dynamic Posterior Stabilization, Chapter 38, 2006, pp. 299-304.

"Graf Soft Stabilization: Graf Ligamentoplasty," YS Kim et al., *Dynamic Reconstruction of the Spine*, Section III, Restoration of Lumbar Motion Segment, C. Dynamic Posterior Stabilization, Chapter 39, 2006, pp. 305-311.

"Isobar TTL Dynamic Instrumentation," A.E. Castellvi et al., *Dynamic Reconstruction of the Spine*, Section III, Restoration of Lumbar Motion Segment, C. Dynamic Posterior Stabilization, Chapter 40, 2006, pp. 312-322.

"Minimally Invastive Posterior Dynamic Stabilization System," L. Pimenta et al., *Dynamic Reconstruction of the Spine*, Section III, Restoration of Lumbar Motion Segment, C. Dynamic Posterior Stabilization, Chapter 41, 2006, pp. 323-329.

"Nonfusion Stabilization of the Degenerated Lumbar Spine with Cosmic," A. von Strempel, *Dynamic Reconstruction of the Spine*, Section III, Restoration of Lumbar Motion Segment, C. Dynamic Posterior Stabilization, Chapter 42, 2006, pp. 330-339.

"BioFlex Spring Rod Pedicle Screw System," YS Kim et al., *Dynamic Reconstruction of the Spine*, Section III, Restoration of Lumbar Motion Segment, C. Dynamic Posterior Stabilization, Chapter 43, 2006, pp. 340-344.

"Facet Replacement Technologies," M.R. Lim et al., *Dynamic Reconstruction of the Spine*, Section III, Restoration of Lumbar Motion Segment, D. Facet Replacement, Chapter 44, 2006, pp. 347-353.

"TOPS—Total Posterior Facet Replacement and Dynamic Motion Segment Stabilization System," L.T. Khoo et al., *Dynamic Reconstruction of the Spine*, Section III, Restoration of Lumbar Motion Segment, D. Facet Replacement, Chapter 45, 2006, pp. 354-363.

"Total Facet Arthroplasty System (TFAS)," S. Webb, *Dynamic Reconstruction of the Spine*, Section III, Restoration of Lumbar Motion Segment, D. Facet Replacement, Chapter 46, 2006, pp. 364-371.

"Indications and Techniques in Annuloplasty," M.Y. Wang, *Dynamic Reconstruction of the Spine*, Section III, Restoration of Lumbar Motion Segment, E. Annular Repair, Chapter 47, 2006, pp. 375-379.

"Molecular Therapy of the Intervertebral Disk," S.T. Yoon, *Dynamic Reconstruction of the Spine*, Section IV, Future Biological Approaches to Disk Repair, Chapter 48, 2006, pp. 383-388.

*Dynamic Reconstruction of the Spine*, D.H. Kim et al., 2006, Index, pp. 389-402.

International Search Report for PCT/US07/70981 dated Apr. 23, 2008, 7 pages.

* cited by examiner

CHILD SEAT FOR A MOTOR VEHICLE

CROSS-REFERENCE TO RELATED PATENT APPLICATIONS

This patent application is a continuation of U.S. patent application Ser. No. 11/143,318, filed Jun. 2, 2005, now U.S. Pat. No. 7,275,792, which claims priority to German Patent Application No. 10 2004 039 204.8, filed Aug. 12, 2004, and German Patent Application No. 10 2004 046 163.5, filed Sep. 23, 2004. The entire disclosure of each of the foregoing patent applications are hereby incorporated by reference herein.

FIELD OF THE INVENTION

The invention relates to a child seat for motor vehicles, with a seat shell and backrest, at the upper end of which is disposed a head support with lateral wings projecting towards the front.

Child seats of this kind are widely known. They are generally attached to a rear seat or the passenger seat of a motor vehicle by means of the safety belt provided in the motor vehicle. An extremely diverse range of designs is available for this purpose; in this context, reference is made to DE 43 28 635 C2 only by way of example.

The present invention is concerned with the provision of increased comfort and increased safety for the child. In this context, child seats, which can be tilted from an upright position into an inclined sleeping position and vice versa are already known. However, these are relatively complicated designs, the construction of which is correspondingly heavy. Moreover, there is the danger, that in the event of a sudden braking of the vehicle, the child could slip forward from the sleeping position, under the safety belt, especially under the waist belt. In this case, there is also especially a risk that the child could be strangled or seriously injured by the diagonal belt. To prevent this, it is imperative that so-called five-point safety harnesses are used with child seats of this kind.

Especially for the weight class from 15 kg to 36 kg (approximately 3.5 to 12 years), child seats, which are held together with the child by the in-vehicle seat belts, are used as an alternative to the above-named child seats. The backrests of these child seats are generally connected to the seat component in a rigid manner. Many designs also provide backrests, which can be rotated on the seat component about a horizontal axis, so that they can be adapted to the inclination of the vehicle backrest and allow a resting position inclined towards the rear for the child.

In most cases, head supports are additionally fitted onto the backrest by plug-in connection. The height of such head supports can be adjusted to the size of the child's body. These head supports generally provide side wings for lateral support and to prevent injuries to the head in the event of a side-on collision. The disadvantage with this design is that no measures are provided to prevent the child's head from tilting forwards if the child falls asleep with the associated relaxation of the neck muscles. In this context, there is also a slight shift in the balance of the upper body as a whole towards the front with the consequence that this also slumps forward. If a side-on collision occurs under such conditions, the child is practically without support, in particular, the lateral wings of the head support are no longer effective.

In the event of a head-on collision, the slumped-forward upper body will generally have slipped out of and/or over the diagonal belt. In this case also, the upper body is largely unprotected.

The present invention is based upon the object of providing a child seat for motor vehicles, which guarantees a high level of comfort with a minimum complexity of design and increased safety for the child by comparison with the prior art.

This object is achieved according to the invention by the characterizing features as shown and described herein.

The essence of the present invention is therefore that the head support and/or head rest can be moved from an upright waking position into a resting or sleeping position inclined towards the rear, in order to prevent the head and possibly the entire upper body of a sleeping child from slumping forward out of the seat structure and to prevent the upper body from twisting free from the diagonal belt. The safety of the child, for example, in the event of a side-on or head-on collision, remains at an unchanged, high level.

The inclination of the head support and/or of the headrest disposed between the two lateral wings of the same can preferably be adjusted either infinitely or stepwise. This is ultimately a question of the expenditure, which the manufacturer wishes to invest in the design.

It is also of essential importance, that the head support is mounted on the backrest in a height-adjustable manner. For this purpose, the head support is preferably disposed at the upper end of a head-support holder mounted in a height-adjustable manner on the backrest, which can be tubular in design or in the form of a plank. In the case of a plank-like design of the head-support holder, a wedge-shaped recess is preferably formed between the two lateral wings, into which the headrest disposed between the lateral wings can be rotated. The rotational bearing for the headrest is preferably disposed at the lower end of the same adjacent to the seat shell.

Further design details of the rotational bearing and of the measures for positioning the head support and/or headrest are described in greater detail in claims 8 and following.

A preferred embodiment of a head support designed according to the invention will be described in greater detail below with reference to the attached drawings. The drawings are as follows.

Figure 1:
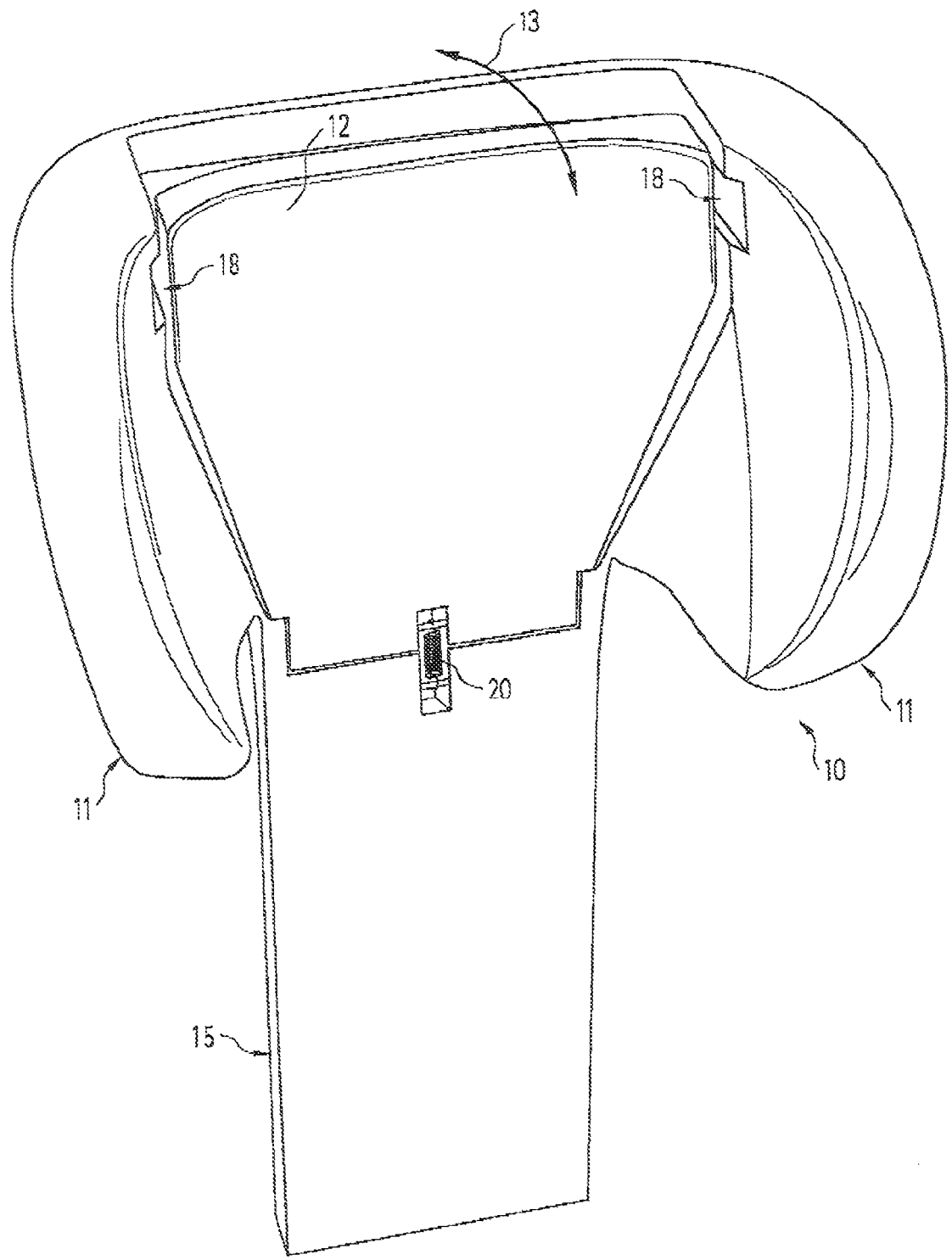
FIG. 1 shows in a perspective front view a head-support structure designed according to the invention.
Figure 2:
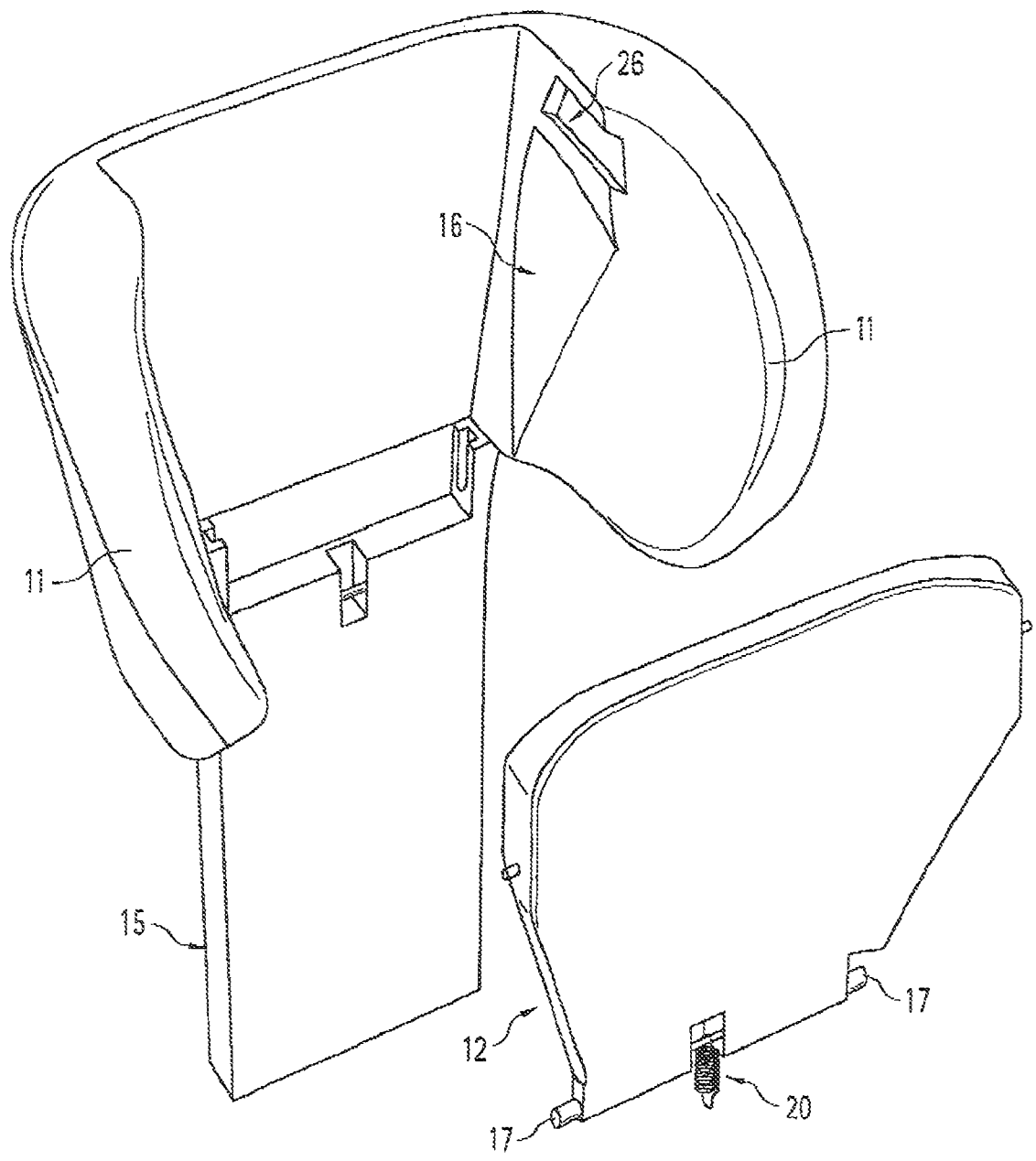
FIG. 2 shows in an exploded perspective view the head-support structure according to FIG. 1.
Figure 3:
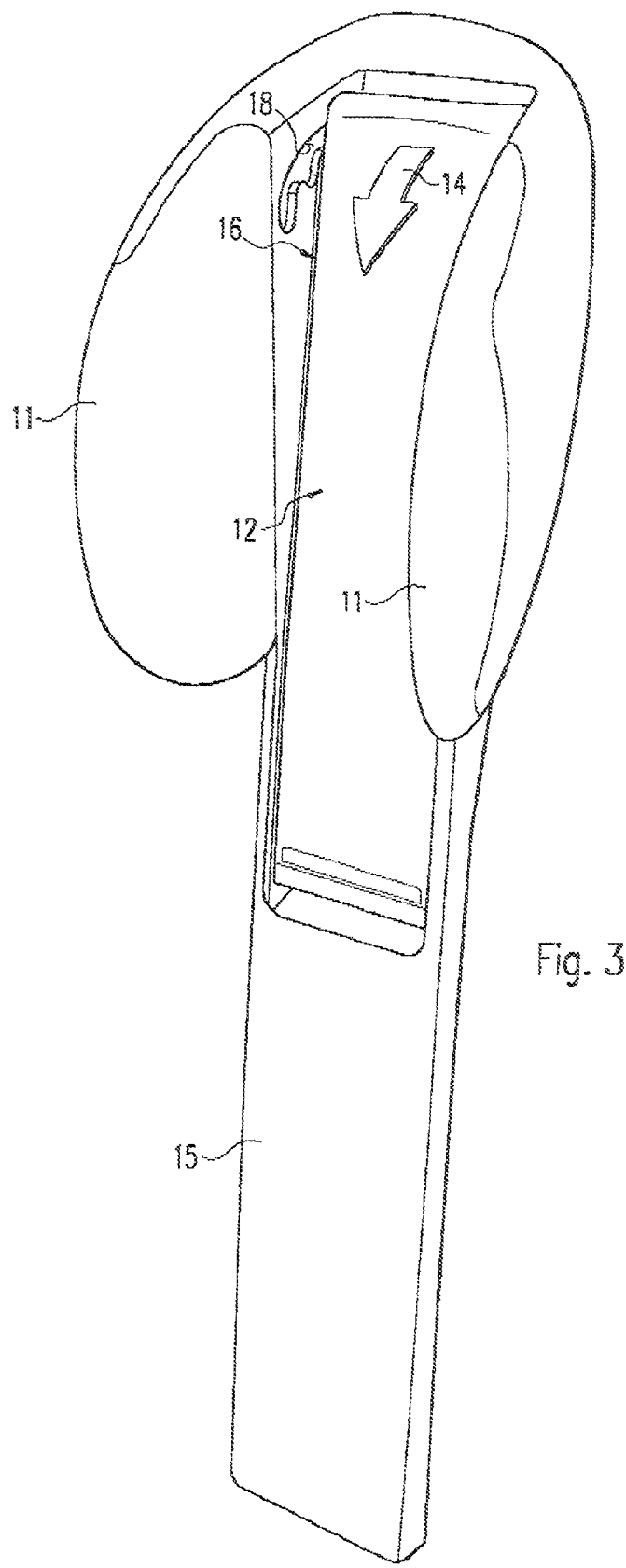
FIG. 3 shows a perspective view corresponding to FIG. 1 of a modified embodiment of a head-support structure.

FIGS. 1 to 3 show schematically a head-support structure according to the invention. It is the head support of a child seat for motor vehicles, which comprises a seat shell and backrest. According to FIGS. 1 to 3, the head support 10 is provided with lateral wings 11 projecting towards the front. A headrest 12 is disposed between the two lateral wings 11, in particular, in such a manner that its inclination relative to the backrest is adjustable. This adjustment is indicated by the double arrow 13 in FIG. 1 and by the arrow 14 in FIG. 3. Alternatively, the entire head support 10 could be mounted in a rotatable manner. In the case of the illustrated exemplary embodiment, however, only the headrest is rotatable, in particular, relative to the two lateral wings 11 and between an upright waking position extending approximately parallel to the backrest and a resting or sleeping position inclined towards the rear. In this context, reference is made to FIG. 4, in which these two positions of the headrest 12 are indicated as follows. The waking position is marked with the reference letter "W" and the resting or sleeping position is marked with the reference letter "S".

Figure 4:
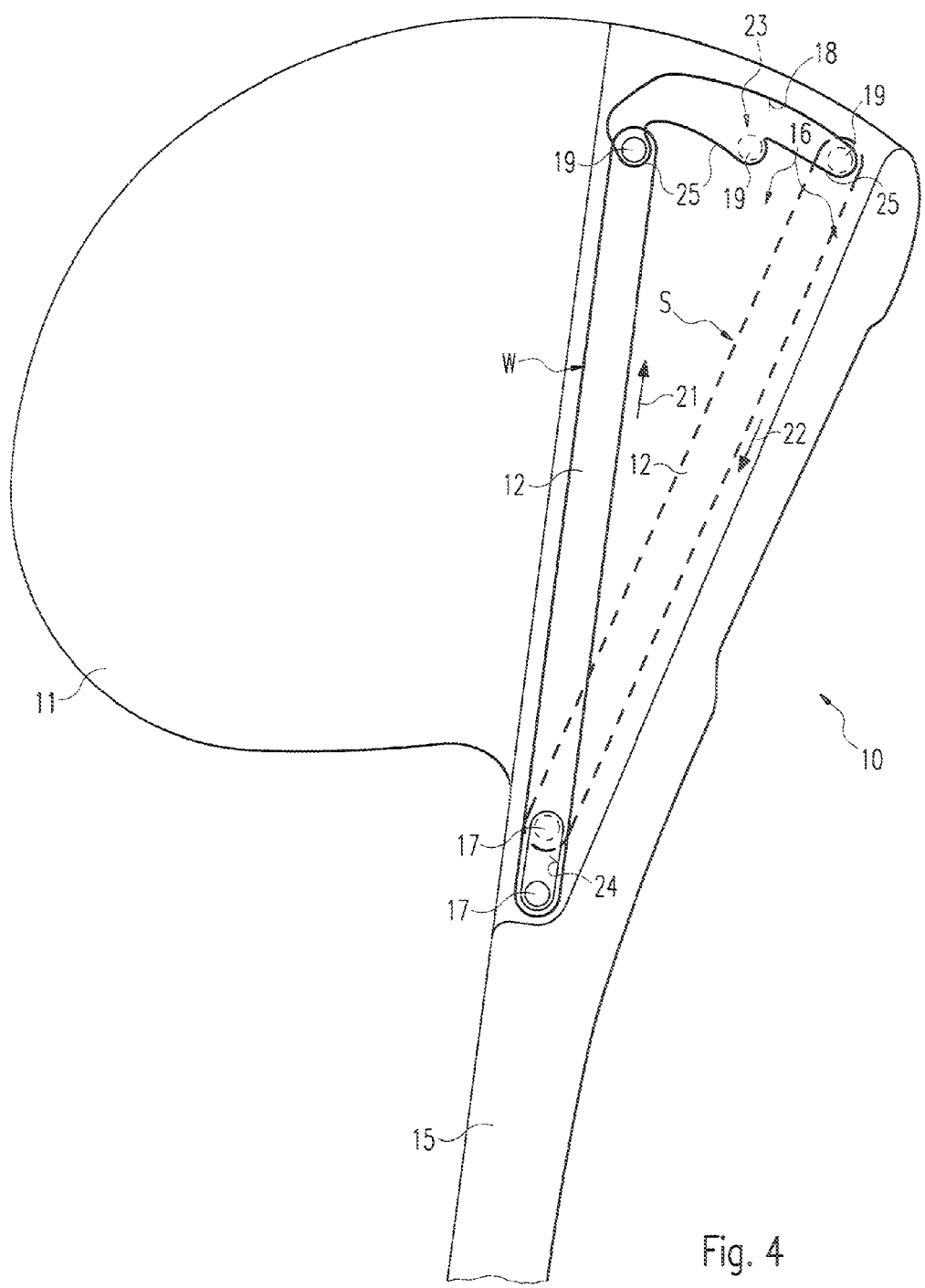
FIG. 4 shows in a schematic lateral view the principle of the head support according to the invention illustrating the rotational mechanism for a headrest disposed between the lateral wings of a head support.

The inclination of the headrest 12 can be adjusted either infinitely or, as shown in FIG. 4, stepwise.

It must be emphasized that the head support 10 is mounted in a height-adjustable manner on the backrest, which is not illustrated in greater detail here. For this purpose, the head support 10 is arranged at the upper end of a head-support holder 15 mounted in a height-adjustable manner on the backrest, which, in the embodiment illustrated in FIGS. 1 and 2 is designed in the form of a plank. Since the mechanism for the height-adjustment of the head support is not relevant to the present invention, this feature is not presented or described in greater detail here. However, a person skilled in the art will know how to design a height-adjustment of this kind. For this purpose, the plank-like head-support holder 15 must always be mounted in a displaceable manner within the backrest, preferably at the rear side of the same. Moreover, complementary locking mechanisms are provided, on the one hand, on the backrest and, on the other hand, on the head-support holder 15, in order to fix the head support at different heights relative to the seating surface of the child seat. To this extent, the child seat can be described as capable of "growing with the child".

In the embodiment shown in FIGS. 1 and 2, and also as shown in FIG. 3, the lateral wings 11 projecting towards the front are moulded at the upper end of the plank-like head-support holder 15. The lateral wings 11 therefore form an integral component of the head-support holder 15.

As shown in FIGS. 3 and 4, a wedge-shaped recess 16 is formed in the region between the two lateral wings 11, into which the headrest 12 disposed between the lateral wings 11 can be rotated (FIGS. 3 and 4). The lower end of the headrest 12 adjacent to the seat shell is mounted on the backrest, and/or in the present case, on the head-support holder 15, in a rotatable manner about a horizontal transverse axis 17. In the upper region of the headrest 12, means are provided for a hook-in connection at different tilting positions relative to the backrest and/or the head-support holder 15, as indicated in FIG. 4 by the reference numbers 18, 19.

Moreover, FIG. 4 shows that the headrest 12 together with the rotational bearing 17 can be raised, preferably against the action of a tension spring 20 (see FIGS. 1 and 2), so that on raising the headrest 12 in the direction of the arrow 21 in FIG. 4, the hook-in connection for a first tilting position, the waking position "W" in FIG. 4, can be released and the headrest 12 can be moved from this waking position into a second tilting position, the sleeping position "S" in FIG. 4 and can be locked in this position by lowering the headrest in the direction of the arrow 22, and vice versa. FIG. 4 also shows that the headrest 12 can be moved into an intermediate position 23 between the waking position and the sleeping position.

The embodiment presented also has the major advantage that in the case of sudden braking and/or a head-on collision, the headrest 12 automatically moves forward because of its mass inertia and is hooked into the waking position "W". Accordingly, the child's head is supported in the upright position when it is jolted backwards at the end of the braking procedure and/or collision. A whiplash trauma is therefore considerably reduced by comparison with a headrest, which is permanently inclined towards the rear and/or, as in the prior art, by comparison with a backrest inclined towards the rear with head support rigidly attached to it.

The rotational bearing 17 of the headrest 12 comprises two mounting pins projecting at both sides of the same or a continuous rotational axis, which projects beyond the latter at both sides of the headrest 12. These mounting pins 17 correspond with oblong retainers 24 disposed in the backrest or respectively, in the present case, in the head-support holder 15 and extending approximately parallel, to the backrest and/or to the head-support holder 15. In the upper region of the headrest 12, a positioning pin 19 projects laterally at least on one side, preferably on both sides of the same. These pins each correspond with a guide channel 18, each of which is formed on the mutually adjacent side of the lateral wing 11 (see also FIG. 3, where the guide channel is an integral component of the lateral wing, and indeed still within the region of the wedge-shaped recess 16). The guide channel 18 is curved to correspond to the circle of rotation of the headrest 12 about the rotational axis 17. Furthermore, the guide channel 18 provides at least two retaining slots 25, in the embodiment shown in FIGS. 3 and 4, three retaining slots 25, into which the positioning pins 19 can be inserted. In every case, two retaining slots 25 of this kind are provided, wherein the one defines the waking position and the other defines the sleeping position of the headrest 12. In the present case, an intermediate position 23 is defined by a middle retaining slot 25.

The above named head-support structure preferably consists of moulded foam parts, but preferably comprises synthetic material parts (e.g. polyethylene) manufaceured using injection-moulding or blow-moulding processes. The individual parts can additionally be covered by upholstery or a fabric covering.

The wedge-shaped recess 16, into which the headrest 12 can be rotated, allows an angle of rotation of approximately 10° to 20°, especially approximately 15° to 17°.

As already explained with reference to FIG. 3, the guide channel 18 can be an integral component of the lateral wings or of the head-support 8 holder. Alternatively, it is also conceivable to provide the guide channel 18 as a separate component, especially made from metal. Corresponding guide catches are then inserted into corresponding lateral recesses in the lateral wings. In FIG. 2, a lateral recess of this kind for receiving a guide channel 18 is marked with the reference number 26.

A hand-grip recess, or a handle, which facilitates the lifting of the headrest 12 against the action of the spring 20, is preferably formed at the upper limiting edge of the headrest 12.

The above description shows that the head support can be rotated independently of the height of the head support relative to the seat surface of the child seat.

All of the features disclosed in the application documents are claimed as essential to the invention, in so far as they are novel either individually or in combination by comparison with the prior art.

REFERENCE MARKINGS

10 Head support
11 Lateral wing
12 Headrest
13 Double arrow
14 Arrow
15 Head-support holder
16 Recess
17 Transverse and/or rotational axis
18 Guide channel
19 Pin or positioning pin
20 Tension Spring
21 Arrow
22 Arrow
23 Intermediate position 24 Oblong retainer
25 Retaining slot
26 Recess
W=Waking position
R=Resting or sleeping position

What is claimed is:

1. A child seat headrest comprising:
a one-piece head support including a generally planar support wall, right and left spaced-apart wings integral with and extending laterally from right and left sides of the generally planar support wall, and a head-support holder integral with and extending downwardly from a bottom side of the generally planar wall;
a head rest member configured between the right and left space-apart wings for pivotal movement relative to the generally planar support wall, the head rest member being pivotally movable between a rearwardly-inclined sleeping position wherein the head rest member is proximate to and substantially coplanar with the generally planar support wall, and an upright waking position wherein the head rest member is at an oblique angle relative to the generally planar support wall; and
a biasing mechanism that urges the head rest member into the upright waking position during a dynamic event to reduce a whiplash trauma experienced by an occupant of the child seat,
the biasing mechanism comprising a spring including first and second ends, a first recess defined in an upper central portion of the head-support holder, the first recess including a first anchor pin, one of the first and second ends of the spring being connected to the first anchor pin, and a second recess defined in a bottom side of the head rest member, the second recess including a second anchor pin, the other one of the first and second ends of the spring being connected to the second anchor pin.

2. The child seat headrest of claim 1 wherein each of the right and left spaced-apart wings includes a slot in an upper portion facing the head rest member, the slot having a hook-in connection that defines the rearwardly-inclined sleeping position and the upright waking position.

3. The child seat headrest of claim 2 wherein the head rest member includes right and left pins extending outwardly from an upper portion of the head rest member toward the respective right and left spaced-apart wings, the right and left pins being configured to couple with the hook-in connection for holding the head rest member in the rearwardly-inclined sleeping position and the upright waking position.

4. The child seat headrest of claim 2 wherein the hook-in connection is defined by a lower surface of the slot, the lower surface having a generally scalloped shape.

5. The child seat headrest of claim 4 wherein the lower surface includes at least one inverse U-shaped portion.

6. The child seat headrest of claim 1 wherein the head rest member includes right and left pins extending outwardly from a lower portion of the head rest member toward the respective right and left spaced-apart wings, and
wherein an intermediate portion of the one-piece head support between the generally planar support wall and the head-support holder includes right and left side oblong apertures, the right and left side oblong apertures configured to receive the right and left pins for effecting vertical and pivotal movement of the head rest member relative to the generally planar support wall.

7. The child seat headrest of claim 1 wherein the head-support holder is generally plank-shaped.

8. The child seat headrest of claim 1 wherein the head rest member is configured to pivot relative to the generally planar support wall through an angle in the range of about 10 degrees to about 20 degrees.

9. A child seat headrest comprising:
a one-piece head support including a generally vertical head-support holder, a generally planar support wall integral with and extending obliquely upwardly and rearwardly from an upper end of the generally vertical head-support holder, and right and left spaced-apart wings integral with and extending laterally from right and left sides of the generally planar support wall;
a head rest member configured between the right and left spaced-apart wings, the head rest member including a pair of pins extending outwardly from a lower portion of the head rest member for pivotally coupling with the right and left spaced-apart wings, the head rest member being pivotally movable about a horizontal pivot axis defined by the pair of pins between a rearwardly-inclined sleeping position wherein the head rest member is proximate to and substantially coplanar with the generally planar support wall, and an upright waking position wherein the head rest member is at an oblique angle relative to the generally planar support wall; and
a biasing mechanism that urges the head rest member into the upright waking position during a dynamic event to reduce a whiplash trauma experienced by an occupant of the child seat;
the biasing mechanism comprising a spring including first and second ends, a first recess defined in an upper central portion of the head-support holder, the first recess including a first anchor pin, one of the first and second ends of the spring being connected to the first anchor pin, and a second recess defined in a bottom side of the head rest member, the second recess including a second anchor pin, the other one of the first and second ends of the spring being connected to the second anchor pin.

10. The child seat headrest of claim 9 wherein each of the right and left spaced-apart wings includes a slot in an upper portion facing the head rest member, the slot having a hook-in connection that defines the rearwardly-inclined sleeping position and the upright waking position.

11. The child seat headrest of claim 10 wherein the hook-in connection is defined by a generally scalloped lower surface of the slot.

12. The child seat headrest of claim 10 wherein the head rest member includes a second pair of pins extending outwardly from an upper portion of the head rest member for coupling with the hook-in connection, and
wherein the spring has a bias to urge the second pair of pins against the lower surface.

13. The child seat headrest of claim 9 wherein an intermediate portion of the one-piece head support between the generally planar support wall and the head-support holder includes right and left side oblong apertures, the right and left side oblong apertures configured to receive the pair of pins for effecting vertical and pivotal movement of the head rest member relative to the generally planar support wall.

14. The child seat headrest of claim 9 wherein the head-support holder is generally plank-shaped.

15. The child seat headrest of claim 9 wherein the head rest member is configured to pivot relative to the generally planar support wall through an angle in the range of about 10 degrees to about 20 degrees.

16. A child seat headrest comprising:
a one-piece head support including a generally planar support wall, right and left spaced-apart wings integral with and extending laterally from right and left sides of the generally planar support wall, and a head-support holder integral with and extending downwardly from a bottom side of the generally planar wall;

a head rest member configured between the right and left space-apart wings for pivotal movement relative to the generally planar support wall, the head rest member being pivotally movable between a rearwardly-inclined sleeping position wherein the head rest member is proximate to and substantially coplanar with the generally planar support wall, and an upright waking position wherein the head rest member is at an oblique angle relative to the generally planar support wall; and the head rest member including right and left pins extending outwardly from a lower portion of the head rest member toward the respective right and left spaced-apart wings and an intermediate portion of the one-piece head support between the generally planar support wall and the head-support holder including right and left side oblong apertures, the right and left side oblong apertures being configured to receive the right and left pins for effecting vertical and pivotal movement of the head rest member relative to the generally planar support wall.

17. The child seat headrest of claim 16 wherein the head-support holder is generally plank-shaped.

18. The child seat headrest of claim 16 wherein the head rest member is configured to pivot relative to the generally planar support wall through an angle in the range of about 10 degrees to about 20 degrees.

19. The child seat headrest of claim 16 wherein each of the right and left spaced-apart wings includes a slot in an upper portion facing the head rest member, the slot having a hook-in connection that defines the rearwardly-inclined sleeping position and the upright waking position.

20. The child seat headrest of claim 16 wherein the head rest member includes right and left pins extending outwardly from an upper portion of the head rest member toward the respective right and left spaced-apart wings, the right and left pins being configured to couple with the hook-in connection for holding the head rest member in the rearwardly-inclined sleeping position and the upright waking position.

* * * * *